No. 668,215. Patented Feb. 19, 1901.
C. J. REED.
GALVANIC BATTERY ELECTRODE.
(Application filed Sept. 14, 1897.)
(No Model.)
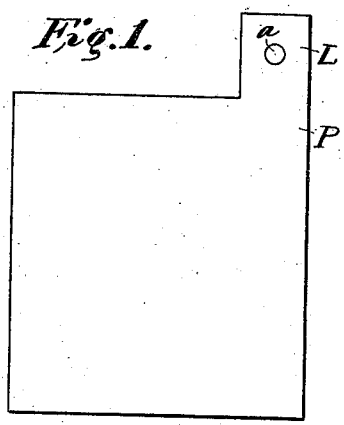
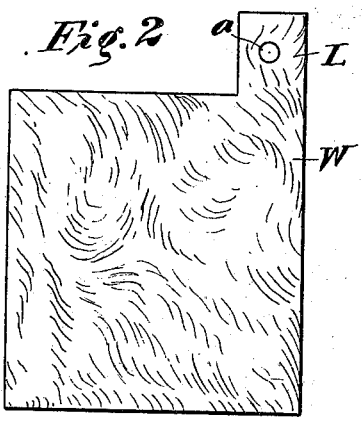
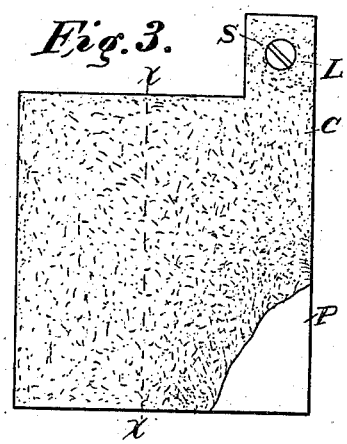
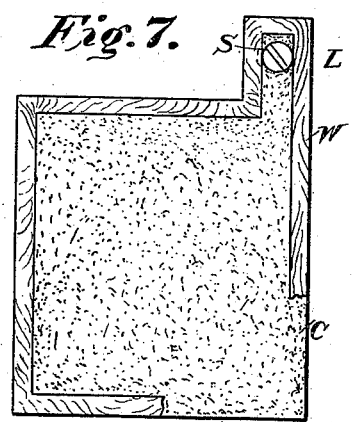
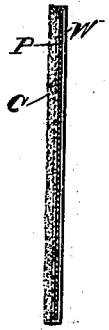
WITNESSES:
Ethan F Dodds
H. C. Tener
INVENTOR
Charles J. Reed
BY
Wesley G. Carr
ATTORNEY
THE NORRIS PETERS CO., PHOTO-LITHO., WASHINGTON, D. C.

UNITED STATES PATENT OFFICE.

CHARLES JOHN REED, OF PHILADELPHIA, PENNSYLVANIA.

GALVANIC-BATTERY ELECTRODE.

SPECIFICATION forming part of Letters Patent No. 668,215, dated February 19, 1901.

Application filed September 14, 1897. Serial No. 651,694. (No model.)

*To all whom it may concern:*

Be it known that I, CHARLES JOHN REED, a citizen of the United States, residing at Philadelphia, in the county of Philadelphia and State of Pennsylvania, have invented a new and useful Improvement in Galvanic-Battery Electrodes, of which the following is a specification.

My invention relates to galvanic-battery plates or electrodes; and it has for its object to provide a flexible carbon electrode which shall occupy a small amount of space and be of minimum weight and which shall be inexpensive and durable and of low electrical resistance.

My invention is illustrated in the accompanying drawings, in which—

Figure 1 is a side elevation of a thin metal plate such as I use in practicing my invention. Fig. 2 is a side elevation of the plate shown in Fig. 1 provided with a thin coating of wax. Fig. 3 is a side, and Fig. 4 an end or edge, elevation of the plate shown in Fig. 2 provided with a coating of powdered or comminuted carbon, portions of the wax and carbon being broken away. Fig. 5 is a vertical section taken on line $x\,x$ of Fig. 3. Fig. 6 is a view similar to Fig. 5, but having a carbon coating on one side only. Figs. 7 and 8 are respectively a side and an end or edge elevation of a finished plate having an edge covering of wax, a portion of which is broken away.

Carbon electrodes for galvanic batteries having the construction usually employed prior to my invention are heavy, thick, and inflexible and have a high electrical resistance. In order to avoid these objectionable characteristics, I employ as a conducting-body a thin sheet or plate P of tin, brass, or other suitable metal—such, for example, as that shown in Fig. 1—to which I attach a waterproof flexible coating consisting of carbon and wax, the particles or grains of carbon being in contact with each other and with the plate P. The plate is first prepared by covering its entire surface with a thin layer of a flexible non-conducting wax, varnish, or cement W, which will be unaffected by the electrolyte in which it is to be used. I prefer to first heat the plate and then to apply the cement either with a brush or by dipping the plate into it. Care must be taken to cover every part of the surface of the plate and to prevent any air-bubbles from adhering to it. The wax should be tough and capable of bending without cracking or scaling off. I am not limited to any particular substance or compound, but I prefer to use a mixture of asphalt, rosin, and pitch in the proportions of about four, two, and one, respectively; but these proportions may be varied to suit any particular requirements. I sometimes find it advantageous also to add a small proportion of Japan wax, beeswax, or paraffin. The carbon or coke to be used is first prepared by grinding to the proper fineness and then thoroughly mixing, while hot, with a suitable proportion of melted insulating-wax, such as that described above. I prefer to mix one part wax with four parts, by weight, of carbon, but may vary the proportion within very wide limits, the only essential requirement being the employment of sufficient wax to thoroughly impregnate or "fill" the carbon and render it waterproof. The amount of wax must not be enough, however, to separate or insulate the particles of carbon from one another. The powdered or comminuted carbon thus prepared is spread in a thin layer C over the entire surface of the waxed plate or over so much of it as is to be in contact with the electrolyte, and is forced into and through the wax, so as to be in intimate contact with the metal plate. This may be accomplished by pressure applied by any suitable mechanism—such, for example, as rolls.

I have shown the plate P as provided with a lug L, having an aperture $a$ for the reception of a binding-post S; but other means for attaching a wire may obviously be employed, if desired.

The plate shown in Figs. 3, 4, and 5 is in a finished state and ready for use. The plate shown in Fig. 6 differs from that shown in Figs. 3, 4, and 5 in having carbon on one side only. This form is adapted for use at the end of a number of plates in one cell and also for use in piles, in which only one side of each of a number of plates connected in series is active.

The plate shown in Figs. 7 and 8 differs from that of Figs. 3, 4, and 5 in that its edges are provided with an insulating-covering W', of wax or cement.

It will be readily understood that the metal plate constituting the support for the carbon serves to reduce the resistance of the electrode and that the structure as a whole is compact and of light weight and not liable to become fractured during either transportation or use.

The form and composition of parts may obviously be varied from what is shown and described without departing from the spirit and scope of my invention.

What I claim as my invention, and desire to secure by Letters Patent, is—

1. A battery-electrode comprising a flexible conducting-plate and an adherent coating of waterproof, granular carbon the grains of which are in electrical contact with the plate and with each other, substantially as herein set forth.

2. A flexible battery-electrode comprising a thin metal plate, a layer of granular carbon in electrical contact with said plate, and a non-conducting cement serving to render said layer of carbon waterproof and to attach it to the metal plate, substantially as herein set forth.

3. A battery-electrode comprising a flexible metal plate or sheet, and an adherent layer or coating consisting of a mixture of comminuted carbon and an insulating wax or cement, substantially as herein set forth.

4. A battery-electrode consisting of a flexible metal plate or sheet having on its surface a layer of insulating cement or wax in which carbon is embedded so as to make contact with the conductor, substantially as herein set forth.

5. The method of forming battery-electrodes which consists in applying to the surface of a conducting-body a coating of insulating wax or cement and subsequently forcing finely-divided or granular carbon into said coating and into contact with the conducting-body.

CHARLES JOHN REED.

Witnesses:
THEODOR LEHMANN,
M. T. MORRILL.